March 7, 1939.   R. RIEGLER   2,149,362
PREPARATION OF NAPHTHALENE VAPOR MIXTURES FOR CATALYTIC OXIDATION
Filed May 27, 1936
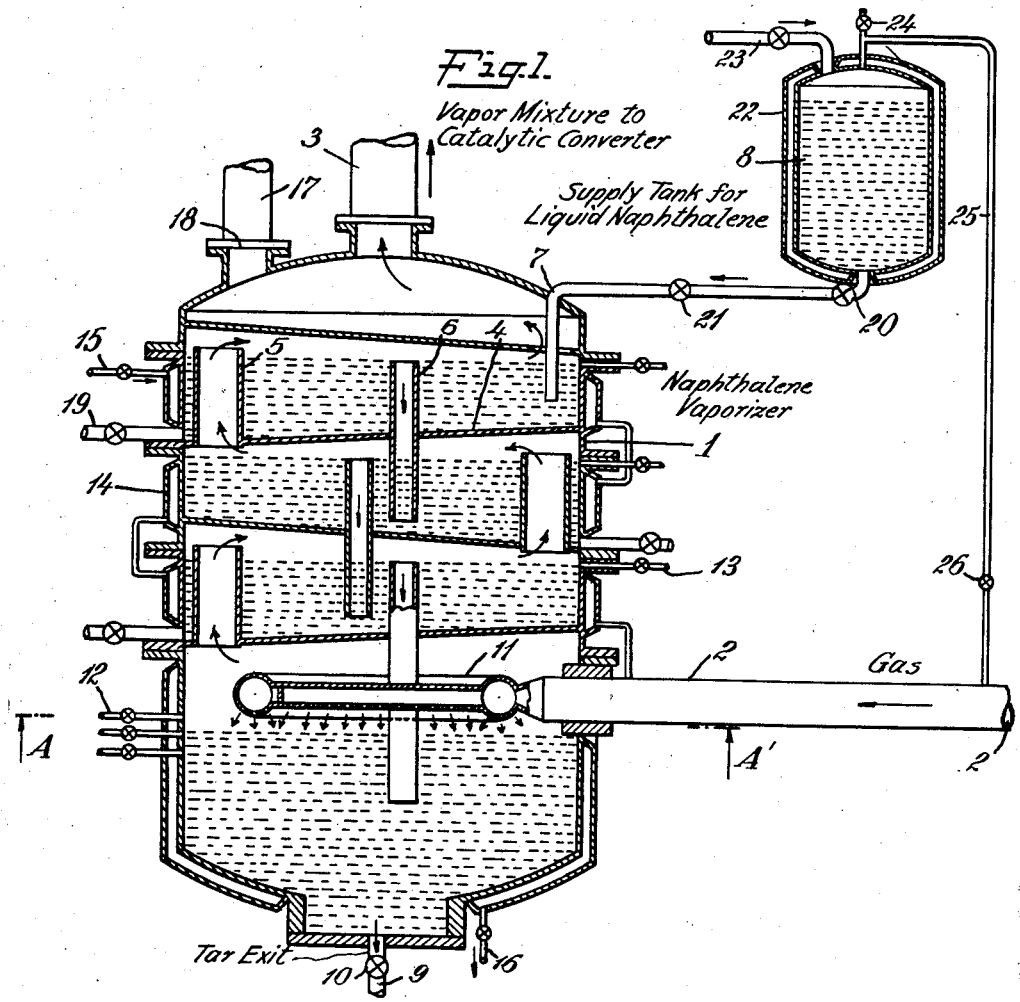
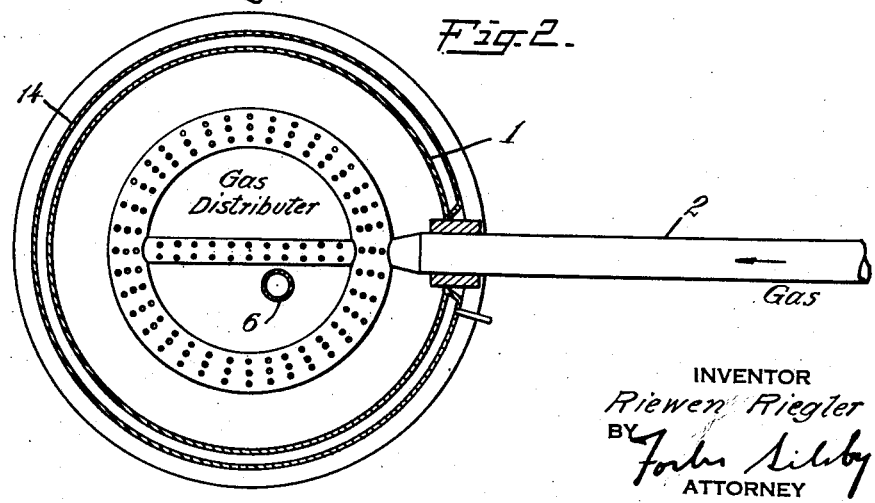
INVENTOR
Riewen Riegler
BY
ATTORNEY Patented Mar. 7, 1939

2,149,362

UNITED STATES PATENT OFFICE 2,149,362

PREPARATION OF NAPHTHALENE VAPOR MIXTURES FOR CATALYTIC OXIDATION

Riewen Riegler, Buffalo, N. Y., assignor to National Aniline and Chemical Company, Inc., New York, N. Y., a corporation of New York Application May 27, 1936, Serial No. 82,028

6 Claims. (Cl. 260—342)

This invention relates to improvements in catalytic oxidation and is particularly concerned with the preparation of naphthalene vapor mixtures suitable for subjection to catalytic oxidation.

Naphthalene employed in vapor phase catalytic oxidation processes is normally obtained associated with other compounds some of which do not adversely affect the catalytic oxidation process and others of which may very adversely affect the process. For illustration, naphthalene suitable for vapor phase catalytic oxidation to phthalic anhydride may be recovered from oils obtained by destructive coal distillation. The naphthalene thus recovered always contains at least appreciable amounts of other constituents. A highly purified naphthalene may contain 99% or more naphthalene and fractional percentages of oily materials and resinous or resin-forming substances such as coumarones, indenes, and unsaturated cyclic hydrocarbons capable of polymerization to form resinous or tarry products.

If resin-forming materials associated with the naphthalene are vaporized along therewith, they may, upon contact with the catalyst at the usual oxidation temperatures, say 300° to 600° C., undergo polymerization with the production of tar in and beyond the catalyst mass. The tar formed beyond the catalyst mass must, of course, be separated from the desired products of the catalytic oxidation process. That which forms upon the catalyst mass tends rapidly to clog the catalyst pores and reduces the effective catalyst surface.

In addition to the tarry material formed in and upon the catalyst itself, it appears that tarry material is actually carried in the vapors entering the converter in the form of solid or liquid particles entrained in the gases. It is possible that this tar is formed during the vaporization process, for example by prolonged heating of impurities present or perhaps by the oxidizing action of the air. Then too, it may be that these tarry materials are initially present in the naphthalene as obtained.

Whatever the source of the tarry products, whether they are initially present or are formed during the vaporization or whether they are formed in the catalyst mass, their presence tends to reduce the catalyst efficiency and contaminate the product of the catalysis and also tends to form hot spots in the catalyst mass which may cause excessive combustion within the converter. It will be obvious that the extent of the damage done by the presence of tarry material will depend upon the proportion in which such material is present in the naphthalene being treated or, stated conversely, the difficulty encountered from this source varies inversely with the purity of the naphthalene. However, the difficulty is not limited to crude naphthalene and has arisen with products of even the highest commercial purity.

The present invention has as an object the vaporization of naphthalene from commercial naphthalene products containing tar or potentially tarry material in such a manner that a vapor mixture is produced practically entirely devoid of constituents of this type. Naphthalene obtained as a product of the destructive distillation of coal contains such constituents in relatively large proportions and the invention is especially applicable to this product.

It has in the past been proposed to effect the vaporization of naphthalene for the production of air-naphthalene mixtures suitable for catalytic oxidation processes by passing air through or over a body of the naphthalene in liquid phase. The supply of naphthalene is continuously or intermittently replenished as vaporization proceeds. In the case of products containing tarry or potentially tarry impurities in even small percentages, the continued evaporation of naphthalene from a body thereof results in the gradual concentration of the impurities. As a consequence of this gradual increase in the content of impurities in the body of liquid, the vapor mixtures produced are not uniform in composition but are of high purity at the beginning of operations and of gradually diminishing purity with gradualy increasing content of vapors of resin-forming constituents as the process continues. The increasing content of impurities in the molten naphthalene tends to cause the liquid to foam as it evaporates, and the foaming encourages entrainment of liquid particles in the gas-vapor mixtures. Eventually the content of impurities becomes so great that the catalytic oxidation process can no longer be carried out with any degree of control and it is necessary to drain out the liquid contents of the vaporizer and to recommence operations with fresh naphthalene. The disadvantages of such an irregular method of operation are manifold. The product obtained by the oxidation process is not of maximum uniformity; the potential life of the catalyst is diminished by deposition of tarry material thereon; and fires in the catalytic converter which result therefrom are not uncommon.

Molten naphthalene itself is a highly efficient solvent and absorbent for the tar-forming constituents which are the source of prior difficulties and this absorptive effect may be utilized for the production of mixtures of aeriform fluid and naphthalene vapor substantially free from tar-forming constituents.

In accordance with the present invention naphthalene products containing tar-forming constituents are vaporized by passing an aeriform evaporating medium over the surface of the naphthalene product in liquid form. The aeriform evaporating medium is brought first into contact with naphthalene of high content of tar-forming constituents and finally in contact with naphthalene containing only a small proportion thereof. In the preferred method of operation a flow of naphthalene is arranged as a stream along the general path of the gaseous medium so that the gaseous medium first contacts with the stream of naphthalene of high content of tar-forming constituents and finally contacts with the stream where it contains only a small proportion thereof. The naphthalene may be maintained as a single flowing stream or shallow body of naphthalene, or a plurality of streams or shallow bodies of naphthalene may be provided with the gaseous medium passing serially thereover. By this method of operation the air or other gaseous medium passing over the naphthalene, during its sojourn, contacts progressively with naphthalene of increasing purity. The naphthalene product as it passes along its course becomes more and more deficient in naphthalene and attains a greater degree of impurity. However, because of the relatively short period of contact of the air with the highly impure material the extent of vaporization of impurities is exceedingly small as compared with the extent of total vaporization. In the countercurrent passage of naphthalene and aeriform evaporating medium, the relatively pure naphthalene entering the contact apparatus absorbs from the gases or vapors contacting therewith the less volatile constituents of the resin-forming type introduced by contact of the aeriform evaporating medium with the naphthalene containing a higher concentration of tar-forming constituents further along in the direction of flow of the liquid naphthalene. This seems to be the case whether the resin type constituents are present in vapor or in liquid form. Accordingly, the impurities are carried along with or as liquid toward the liquid outlet end of the contact apparatus and may be withdrawn intermittently or continuously from this end of the apparatus.

The passage of the aeriform fluid medium in contact with the stream or streams of naphthalene should be conducted so as to avoid bubbling of the liquid or splashing thereof and consequent entrainment of liquid in the aeriform fluid. Any liquid particles which are entrained at the end of the apparatus at which the aeriform fluid enters will pass along the surface of naphthalene for a relatively long distance and, in most cases, will be eliminated by deposition and absorption in the liquid before the gaseous evaporating medium leaves the contact apparatus.

To promote the contact of the gas with liquid both for the purpose of increasing the degree of vaporization in a given contact area and to promote the deposition and absorption of any entrained liquid material or vapors of tar-forming impurities, it is advantageous to provide a tortuous flow of both the liquid and evaporating medium. It is not essential that the flow of the liquid be countercurrent to the flow of gas throughout the contact with the surface of liquid naphthalene, but the general course of flow should be of this type. More specifically, in the use of countercurrent flow of gas and liquid, the gas may be caused to flow in a zigzag course over the surface of a relatively straight liquid course, or a zigzag liquid course may be provided in contact with a relatively straight gas passage. But in this countercurrent operation the gas should be directed continually along a path, causing it to contact with liquid containing a lower and lower content of impurities as it proceeds along its course.

The material being evaporated should be maintained in liquid phase by application of heat if necessary but such heating should be controlled to maintain the material below boiling temperature at the pressure of operation.

The apparatus illustrated in the drawing is a form of apparatus which I have found eminently satisfactory for carrying out the process of my invention.

In the drawing, Fig. 1 is a sectional elevation of the preferred type of vaporizer, and Fig. 2 is a cross-section along the plane A, A' of Fig. 1.

The contact apparatus comprises a multi-compartment vessel 1 having an inlet pipe 2 near the bottom for the introduction of an aeriform fluid and an outlet 3 at the top for the removal of the vapor mixture produced. The vessel is divided into a vertical series of compartments by means of sloped trays or plates 4. The slope of trays 4 has a double function, firstly, that of permitting complete draining and, secondly, that of directing and confining the evaporating fluid to effect its distribution along the surface of the liquid. Each tray is provided with a vapor pipe 5 passing through its lower end and extending upwardly to a point slightly below the tray next above and also with an overflow pipe 6 passing through the tray and extending upwardly to a plane slightly below the upper end of the vapor pipe in the same tray and also below the lower end of the vapor pipe in the tray next above. The lower end of each pipe 6 is arranged sufficiently below the top of the pipe 6 in the next lower tray to provide a liquid seal.

A liquid supply pipe 7 leads into the top of the vaporizer from a suitable supply tank 8. As is the case with the other liquid inlets, the mouth is below the liquid level in the compartment. A liquid outlet 9 having a valve 10 is provided at the bottom of the vessel for withdrawing evaporation residue.

The inlet pipe 2 may be provided with suitable distributing means such as a perforated ring 11 arranged to direct the entering fluid downwardly against the surface of the liquid in the lowermost compartment of the vaporizer. For checking the liquid level in this compartment in order to assure that it does not rise above or fall too far below the distributor, tricocks 12 or any other level testing or indicating means may be provided. Similar testing or indicating means 13 may be provided for the other compartments of the apparatus but are unnecessary in usual operations.

The vaporizer is preferably jacketed by a heating jacket 14 for regulating the temperature of the liquid therein. The steam jacket is provided with a steam inlet 15 and an outlet 16. While the general construction of the vaporizer is in accordance with well-recognized principles, certain features of construction have been found especially desirable. It has been found advantageous to employ a series of separate sections, each section constituting one of the compartments of the vaporizer. This provides for varying the capacity of the vaporizer as desired to suit specific operating conditions merely by increasing or decreasing the number of sections in the unit. In the drawing the sections are shown as flanged and they may be provided with suitable gaskets to maintain gas tight joints. It will, of course, be realized that the smaller variations in capacity may be effected by controlling the temperature of the unit and entering fluids. An auxiliary gas outlet 17, provided with an explosion disk 18, is shown leading off from the uppermost compartment. Each compartment of the apparatus may be provided at its lowest point with a liquid outlet 19 for draining the compartment.

Liquid inlet pipe 7 may be provided with a cut-off valve 20 and a flow valve 21. Flow valve 21 may be of any suitable type for regulating the flow from vessel 8 into the evaporating apparatus, thus a suitably calibrated needle valve may be provided or a fixed orifice may be used. A meter (not shown) may be provided to indicate the flow of naphthalene through pipe 7 in order to maintain the desired rate.

The supply tank 8 is provided with a steam jacket 22, has an inlet 23 for fresh vaporizable material, a valve-controlled gas outlet 24 to permit reduction of pressure in tank 8 during filling, and a pipe 25 connecting with inlet pipe 2. The pipe 25 has a valve 26 for adjusting the pressure in tank 8 to correspond to that in the vaporizer.

The following description of the process illustrates the operation of this apparatus. Supply tank 8 is filled with molten naphthalene, valved outlet 24 being open and the valves 20 and 26 being closed during this operation. When the supply tank is full, the outlet 24 is closed and valve 26 is opened. Valve 20 is then opened to permit the naphthalene to flow into the vaporizer. It will be appreciated that this procedure is for the purpose of overcoming the superatmospheric pressure in the vaporizer and that in starting up the naphthalene may be permitted to flow directly to the vaporizer until it is filled to normal capacity as determined by flow of liquid from the middle one of tricocks 12 but not from the top one. The level of molten naphthalene in each one of the trays 4 will then be just sufficiently above the upper ends of pipes 6 to cause the liquid to flow down therethrough to the next lower tray. The temperature of the naphthalene is maintained at about 110° C. to about 130° C. by means of the steam jackets 14 and 22.

Air at a pressure of say 2 atmospheres absolute and a temperature between about 110° C. and about 130° C. enters the vaporizer through inlet 2 and distributor 11, absorbs vapors from the body of liquid naphthalene, and passes upwardly, mixed with naphthalene vapor, in a circuitous path and over the liquid in each tray. The air-vapor mixture passes out through outlet 3 without substantial loss of pressure and thence to the converter. As the naphthalene is vaporized, additional naphthalene is supplied from tank 8, valve 21 being adjusted to give the desired flow and maintain the liquid level in the compartments of the vaporizer substantially constant. If during operation the naphthalene supply in tank 8 becomes low, it may be replenished by closing valve 20 and valve 26, opening gas outlet 24 to permit the pressure within tank 8 to be reduced to atmospheric pressure, and thereupon opening the inlet 23. When tank 8 is again full, the naphthalene inlet and air outlet should be closed and the valve 26 opened to bring the pressure in tank 8 back to that in vaporizer 1. Valve 20 then may be reopened and the flow of naphthalene continued. Although this operation causes cessation of naphthalene flow to vaporizer 1 for a short time, the period required for refilling is short and hence does not greatly affect the operation of the vaporizer.

It should be noted that in the above operations the aeriform fluid, entering by means of distributor 11, impinges upon the surface of the body of liquid in the lowermost chamber or compartment of the vaporizer. This assures intimate surface-contact of the aeriform fluid with the liquid in this compartment and rapid removal of vapors formed. The gas-vapor mixture passes from the lowermost compartment up through the vapor pipes 5 and upon its exit from each of these pipes it is sharply deflected and spread out over the surface of liquid in the corresponding compartment. Each sharp deflection of the gas-vapor mixture takes place in a dry zone,—that is, the angle or edge of the apparatus about which the mixture pivots is not wet with the liquid in the trays. Provision of dry angles permits a relatively high velocity of flow without the danger of entrainment which would result were the deflection to take place in a zone having liquid along the apparatus surfaces. The sharp deflection of the gas-vapor mixture serves to intimately mingle and regularize the gas and vapor and also to eliminate any entrained particles from the mixture. As the liquid flows down through the apparatus, the small percentage of tarry impurities present becomes greater and greater until in the lowermost chamber they may amount to a relatively high percentage of the total mixture. Normally it is desirable to effect removal of tarry constituents from this compartment at such a rate that the concentration does not exceed about 30% of the liquid. This may be done either continuously or intermittently. If the removal is intermittent, it may be accomplished merely by opening valve 10 on outlet 9 to cause the liquid to flow therethrough. When substantially all of the liquid is removed from the compartment, the valve is closed and the flow through inlet pipe 7 may be increased to refill the compartment to the desired level. Since the gas passing through the apparatus continues to contact with the surface of liquid in the upper compartments of the vaporizer, it is unnecessary to discontinue the vaporization operation during the draining of the compartment in this manner. In some instances it may be desirable, however, to increase the temperature of the liquid in the upper compartment to accelerate vaporization sufficiently to compensate for the reduced vaporization resulting from the lowering of the liquid level in the lowermost compartment.

For continuous removal of tarry impurities, the valve 10 may be adjusted so that the rate of withdrawal through outlet 9 bears such a relation to the flow through inlet 7 that a concentration of around 25% to 30% of tarry material is maintained in the lower compartment and at the same time the proper liquid level is kept substantially constant.

Whether continuous or intermittent operation is employed will depend to a considerable extent upon the degree of impurity of the liquid being treated, for example with a naphthalene of more than 99% purity and containing ½ of 1% of tarry impurities concentration to 30% tarry material would require evaporation of approximately 98½ parts of naphthalene and removal of 1½ parts of liquid for each 100 parts introduced. In such an instance the quantity of tarry liquid removed may be insufficient to justify continuous removal. With a naphthalene containing substantially greater percentages of tarry material, the ratio of liquid removed from the lower compartment to naphthalene introduced is considerably higher and accordingly continuous operation may be more desirable.

It may be remarked further that in the preparation of vapor phase mixtures suitable for catalysis it is usually desirable to provide sufficient oxidizing gas so that the naphthalene is at no time present in explosive percentages. For air this usually means that a weight ratio of air to naphthalene above about 22 or 23 to 1 should be maintained. Ratios of 30 to 35 to 1 are frequently employed and much higher ratios may be used. This large amount of air accelerates and increases the vaporization of less volatile impurities. The present process which provides for the absorption of such impurities as may thus be vaporized accordingly is especially beneficial in this type of operations.

By the term "aeriform evaporating medium" employed herein I mean a gas or vapor or mixture thereof suitable for evaporating naphthalene from a molten body thereof and forming therewith a naphthalene vapor mixture. Gases or vapors which seriously attack the naphthalene under the conditions of vaporization of course are not suitable.

I claim:

1. In the conversion of naphthalene to partial oxidation products by vapor phase catalytic oxidation involving the preparation of a vapor phase naphthalene mixture from an aeriform evaporating medium and naphthalene containing tar-forming constituents, the improvement which comprises bringing a stream of the evaporating medium into contact with naphthalene in liquid phase containing tar-forming constituents, and passing the resultant mixture of the evaporating medium and naphthalene vapors into contact with naphthalene in liquid phase containing tar-forming constituents in lower concentration than contained in the first-mentioned naphthalene.

2. The method of forming a naphthalene vapor and air mixture for vapor phase catalytic oxidation, which comprises passing a stream of air over the undisturbed surfaces of a series of bodies of molten naphthalene containing tar-forming constituents, each successive body of the series being at a higher elevation than the preceding body of the series, withdrawing a mixture of air and naphthalene vapor from contact with the highest liquid body, substantially continuously introducing additional naphthalene to the highest liquid body to cause liquid naphthalene to flow from said body down to the next lower body and thence down to the next lower body in the series, and withdrawing a liquid concentrate of tar-forming constituents from the lowest compartment.

3. In the conversion of naphthalene to partial oxidation products by vapor phase catalytic oxidation involving the preparation of a vapor phase naphthalene mixture from an aeriform evaporating medium and naphthalene containing tar-forming constituents by contact of a stream of aeriform evaporating medium with naphthalene, the improvement which comprises passing naphthalene in liquid phase substantially continuously from loci of later contact with the stream of aeriform evaporating medium to the loci of earlier contact.

4. In the conversion of naphthalene to partial oxidation products by vapor phase catalytic oxidation involving the preparation of a vapor phase naphthalene mixture from air and naphthalene containing tar-forming constituents by contact of a stream of air with naphthalene, the improvement which comprises passing naphthalene in liquid phase substantially continuously from loci of later contact with the stream of air to loci of earlier contact.

5. The method of forming a naphthalene vapor and air mixture for vapor phase catalytic oxidation, which comprises bringing a stream of air into contact with naphthalene in liquid phase containing tar-forming constituents, and passing the resultant mixture of air and naphthalene vapors into contact with naphthalene in liquid phase containing tar-forming constituents in lower concentration than contained in the first mentioned naphthalene.

6. The method of forming a naphthalene vapor and air mixture for vapor phase catalytic oxidation, which comprises passing a stream of air over the surface of naphthalene in liquid phase containing tar-forming constituents, and passing the resultant mixture of air and naphthalene vapors over the undisturbed surface of naphthalene in liquid phase containing tar-forming constituents in lower concentration than contained in the first mentioned naphthalene.

RIEWEN RIEGLER.